United States Patent
Neff et al.

[11] Patent Number: 6,043,573
[45] Date of Patent: Mar. 28, 2000

[54] LINEAR ACTUATOR WITH BURN-OUT-PROOF COIL

[75] Inventors: Edward A. Neff, Rancho Santa Fe; Toan Vu, San Diego; Chia-Tung Chen, Fullerton; Mathieu Allard, San Diego, all of Calif.

[73] Assignee: Systems, Machines, Automation Components, Corporation, Carlsbad, Calif.

[21] Appl. No.: 09/191,089

[22] Filed: Nov. 12, 1998

[51] Int. Cl.$^7$ .................................................. H02K 41/00
[52] U.S. Cl. ................................................................ 310/13
[58] Field of Search .................................. 310/12, 13, 14; 318/135

[56] References Cited

U.S. PATENT DOCUMENTS

| | | | |
|---|---|---|---|
| 4,498,023 | 2/1985 | Stout | 310/14 |
| 4,575,652 | 3/1986 | Gogue | 310/49 R |
| 4,809,430 | 3/1989 | Maruyama et al. | 29/834 |
| 5,175,456 | 12/1992 | Neff et al. | 310/13 |
| 5,703,417 | 12/1997 | Kelly | 310/12 |
| 5,726,508 | 3/1998 | Neff et al. | 310/12 |
| 5,777,403 | 7/1998 | Yuan | 310/12 |
| 5,798,582 | 8/1998 | Neff | 310/13 |

*Primary Examiner*—Nestor Ramirez
*Assistant Examiner*—Judson H. Jones
*Attorney, Agent, or Firm*—Nydegger & Associates

[57] ABSTRACT

A method for manufacturing a linear voice coil actuator, capable of continuously generating a one hundred kilogram force with less than two amperes of current, requires using a coil for generating an electrical field and an unsaturated permanent magnet circuit for generating a magnetic field. In the method of manufacture, a flat surface of the electrical coil is positioned parallel to a flat surface of the magnet to establish a gap therebetween. Before operating the actuator, when no current is running through the coil, a distance of approximately 0.75 mm is established across the gap. Subsequently, during operation of the actuator, when a current of less than approximately two amperes is driven through the coil, the electrical field generated by the coil interacts with the magnetic field of the magnet to generate as much as a 100 kg force on the coil.

21 Claims, 1 Drawing Sheet

LINEAR ACTUATOR WITH BURN-OUT-PROOF COIL

FIELD OF THE INVENTION

The present invention pertains generally to methods for making linear voice coil actuators. More specifically, the present invention pertains to a method for making a voice coil actuator which can be continuously operated without external cooling apparatus or limited duty cycles. The present invention is particularly, but not exclusively, useful as a method for manufacturing a linear voice coil actuator with a burn-out-proof coil which can continuously generate as much as one hundred kilograms of force with less than approximately two amperes of current.

BACKGROUND OF THE INVENTION

As is well known in the industry, linear voice coil actuator s can be used for a variety of tasks. Included in these tasks are the measuring of components, the positioning and retrieval of parts, and other manufacturing activities in general. For all of these tasks it is an industry standard that the voice coil actuator must be generally capable of generating a one hundred kilogram force on a continuous basis for extended periods of time. Preferably, this can be done with less than two amperes of current. Further, it is very desirable for a voice coil actuator to be robust, accurate and reliable. Another, very important characteristic of a voice coil actuator is that it be compact. This is particularly so where manufacturing operations require the simultaneous use of many actuators. Together with these considerations, it is of utmost importance that the actuator not be prone to failures.

Heretofore, in the effort to balance the need for relatively large forces (e.g. 100 kg), with the desire for a small compact actuator, the typical solution has been to run the actuator at high current levels. The number one reason for the field failure of a voice coil actuator, however, is coil "burn out." As is well known, "burn out" results when efforts are taken to either increase the forces that can be generated by the actuator, or to extend the duration of its operational cycle. To accomplish these objectives, it has been the practice to apply excessive current to the coil of the actuator. When excessive currents are run through a coil, however, excessive heat is generated. In time, this heat causes the wire insulation to melt and short out the coil, or it causes the coil to deform which can also cause a short. Another problem arises when the coil deforms and bulges due to the excessive heat that is generated by the excessive current. In a voice coil actuator, such a deformation of the coil can cause the coil to contact other metallic parts of the actuator. When this happens, a short can result. The consequence in either case is a failure of the voice coil actuator.

Several solutions have been proposed for the problems noted above. These include: 1) the incorporation of thermistors which will alert the operator to damaging heat levels in the actuator; 2) the use of fans for cooling the actuator during its operation; and 3) the establishment of limited duty cycles for actuator operation which will require the actuator be given a "rest" for predetermined shut down periods. All of these solutions, however, have their shortcomings and are generally of questionable efficiency.

In light of the above it is an object of the present invention to provide a method for manufacturing a linear voice coil actuator which can generate as much as one hundred kilograms (100 kg) of force with no more than approximately 2 amperes of current running through its coil. Another object of the present invention is to provide a method for manufacturing a linear voice coil actuator which can be continuously operated for extended periods of time without "burning out" the coil. Yet another object of the present invention is to provide a linear voice coil actuator which is relatively easy to manufacture, is simple to operate and comparatively cost effective.

SUMMARY OF THE PREFERRED EMBODIMENTS

A method for manufacturing a linear voice coil actuator with a burn-out-proof coil includes mounting a permanent magnet on a base to establish an unsaturated magnetic circuit. The magnet needs to have at least one flat surface and be capable of generating a magnetic field which has a field strength of 0.4 to 0.5 Tesla. Next, an electrical coil is positioned on the base for linear reciprocal motion relative to the magnet thereon. The electrical coil also needs to have at least one flat surface. More specifically, the magnet and the coil are both mounted on the base with their respective flat surfaces facing each other to establish a gap therebetween. For purposes of the present invention, the distance across this gap will be approximately seventy five hundredths of a millimeter (0.75 mm) when there is no current running through the coil. During the operation of the linear voice coil actuator, when maximum current is running through the coil, there should not be more than approximately a twenty hundredths of a millimeter (0.20 mm) reduction in the distance across the gap. Importantly, during operation of the linear voice coil actuator, the respective flat surfaces of the magnet and the electrical coil will remain substantially parallel to each other.

Various configurations of magnets and electrical coils are contemplated by the present invention. For instance, two magnets can be used and positioned on opposite sides of the electrical coil. For such a configuration, the second magnet can be mounted on the base and interconnected with the first magnet by a steel return line. Thus, the magnets will cooperate with each other in generating the magnetic field. Like the first magnet, however, the second magnet will also need to have a flat surface. Further, the electrical coil will need a corresponding flat surface which will face the flat surface of the second magnet. For this configuration of the voice coil actuator, a second 0.75 mm gap is established between the second magnet and the electrical coil.

In the operation of a voice coil actuator manufactured in accordance with the present invention, a current of up to approximately two amperes (2 amps), and perhaps as much as two point two amperes (2.2 amps), can be selectively driven through the coil to generate an electrical field. According to the direction of the current in the coil, and the consequent direction of the electrical field, a force will be generated between the electrical current of the coil and the magnetic field of the magnet which will move the coil relative to the magnet. Although current through the coil will result in some expansion of the coil, due to the selection of the gap distance, the generation of a sufficiently strong magnetic field by an unsaturated magnet, and the maintenance of current levels at or below 2.2 amperes, the voice coil of the present invention can operate continuously without either external cooling or imposed duty cycles. More specifically, as contemplated by the present invention, the voice coil actuator can operate continuously, and generate forces of as much as 100 kg, without burning out the coil.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
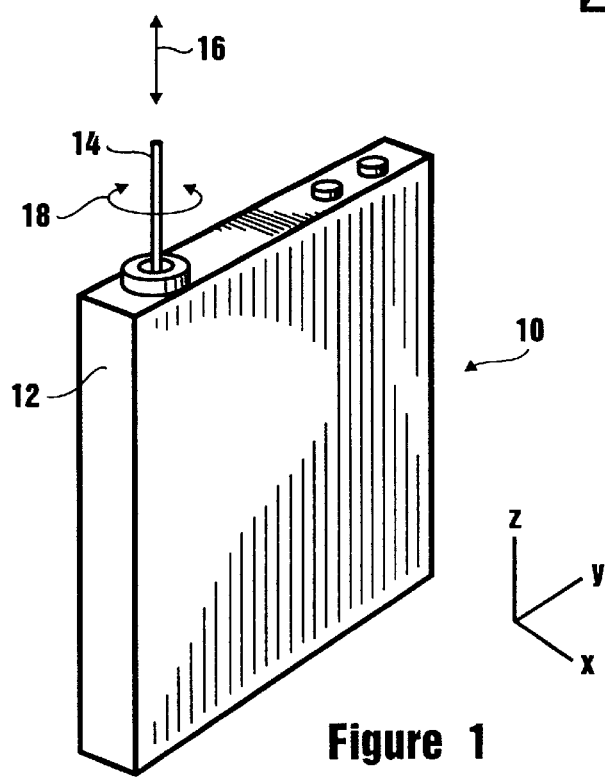
FIG. 1 is a perspective view of a voice coil actuator manufactured in accordance with the methods of the present invention.

Referring initially to FIG. 1, a voice coil actuator manufactured in accordance with the methods of the present invention is shown and is generally designated 10. As shown, the actuator 10 includes a case 12 which surrounds and covers the inner working components of the actuator 10. Clearly seen from the outside of the actuator 10 is a probe 14 which is mounted on the actuator for reciprocal motion in both translation (indicated by the arrow 16) and in rotation (indicated by the arrow 18). It is also to be appreciated that the actuator 10 can be moved in the x, y and z directions for accurate positioning in space. Once the actuator is properly positioned, the probe 14 can be activated to move in translation (the z direction) and in rotation (θ). The inner components of the actuator 10 which move the probe 14 in translation will be best seen by reference to FIG. 2.

Figure 2:
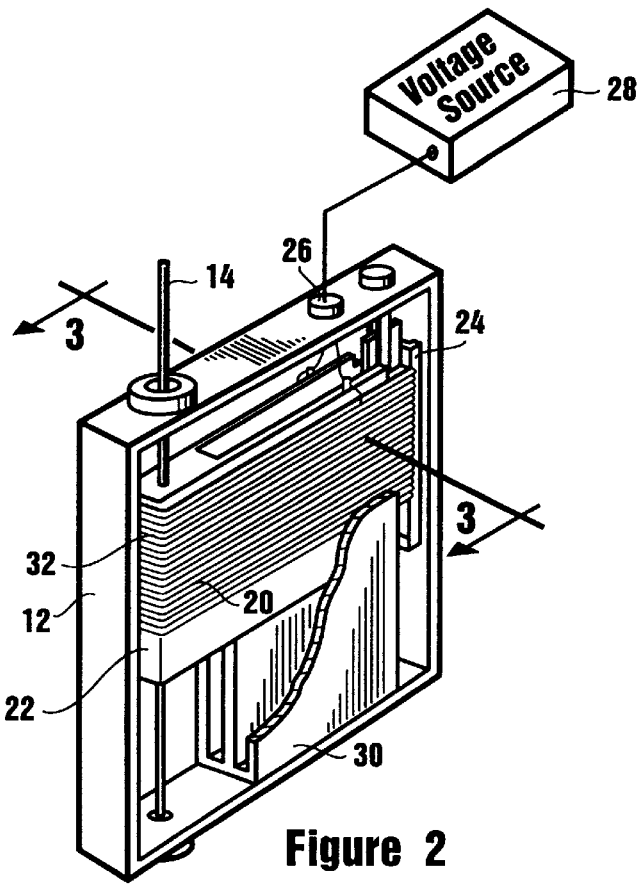
FIG. 2 is a perspective view of the voice coil actuator with portions exposed and broken away for clarity.

In FIG. 2 it will be seen that inside the case 12 of actuator 10 there is an electrical coil 20 which is mounted on a bobbin 22. Further, it will be seen that the bobbin 22 is attached to a slide 24 which is mounted on the case 12. With this combination, the coil 20 is free to move in translation. Importantly, the probe 14 is mounted on the coil 20, so that it too is free to move in translation relative to the case 12. The present invention recognizes that various types of coils 20 can be employed, and that certain coils 20 do not use a bobbin 22. The probe 14, however, needs to be mounted on the case 12 so that it can move in translation. Therefore, If the probe 14 is to move with the coil 20, it must somehow be mounted either on the bobbin 22 of the coil 20, or on some common structure (not shown) which will support both the coil 20 and the probe 14. For the present invention, if a bobbin 22 is used, the bobbin 22 is preferably made of a relatively light weight plastic material or an anodized, insulated, aluminum material. Also, for the present invention, the coil 20 is made of a copper wire in the range of 20–40 gauge.

As intended for the present invention, the electrical coil 20 is electrically connected via a connector 26 with a voltage source 28. As is well known, whenever the voltage source 28 is activated to run an electrical current through the coil 20, an electrical field will be generated. For purposes of the present invention the current which is to be driven through the coil 20 by the voltage source 28 will be limited to approximately two amperes (2 amps).

FIG. 2 also shows that a magnet 30 is mounted inside the case 12 of the actuator 10. Importantly, for the present invention, the steel return line of magnet 30 needs to be unsaturated so that whatever current is driven through the coil 20, there will be a positive, and generally linear response. In this respect, it is to be understood that the magnet 30 generates a magnetic field that will interact with the electrical current of the coil 20 to generate a force on the coil 20. This force will also act on the probe 14. As intended for the present invention, the force that is generated on the coil 20 (and probe 14) will be approximately 100 kg when 2 amps of current are driven through the coil 20 by the voltage source 28. In order to continually generate such forces for prolonged periods of time using only 2 amps of current through the coil 20 requires the actuator 10 be manufactured with specific spacings and tolerances in mind. Of particular importance in this regard is the spacing between the coil 20 and the magnet 30.

Figure 3:
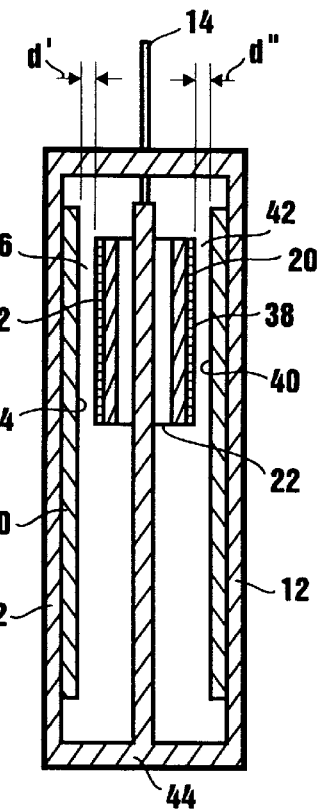
FIG. 3 is a cross sectional view of the voice coil actuator as seen along the line 3—3 in FIG. 2.

By cross referencing FIG. 2 with FIG. 3, it will be seen that the coil 20 has a substantially flat surface 32 and that the magnet 30 has a substantially flat surface 34. Importantly, the flat surface 32 of coil 20 is positioned to face the flat surface 34 of the magnet 30 to establish a gap 36 between them. The distance, d', across the gap 36 is established to be approximately 0.75 mm before operation of the actuator 10 is initiated. Under these conditions there is no current running through the coil 20. Further, by restricting the current in coil 20 to approximately 2 amps, any deformation of the coil 20 caused by the operation of actuator 10 will be such that the distance, d', across gap 36 decreases by not more than 0.20 mm. Stated differently, the design of actuator 10 maintains a distance d' across gap 36 that is always greater than approximately 0.55 mm.

FIG. 3 also shows that the magnet 30 can actually be two different magnets which will cooperate with each other to generate the magnetic field that is required for operation of the actuator 10. For this configuration, as indicated above, the coil 20 will require a second substantially flat surface 38, and the magnet 30 will require a second substantially flat surface 40. When positioned in accordance with the present invention, the flat surfaces 38 and 40 will establish a gap 42 between them. Like the gap 36, the gap 42 will have a distance, d", which is designed to be approximately 0.75 mm. Also like the gap 36, the distance d" across the gap 42 will decrease by not more than 0.20 mm during the operation of the actuator 10. When the magnet configuration 30 establishes the two gaps 36, 40, a steel return line 44 can be used to interconnect the magnetic components and help contour the magnetic field that is generated.

While the particular Linear Actuator With Burn-Out-Proof Coil as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for manufacturing a linear voice coil actuator having a burn-out-proof coil, wherein the actuator is capable of continuously generating approximately as much as a one hundred kilogram force while running less than two amperes of current through the coil, the method which comprises the steps of:

mounting a magnet on a base to create an unsaturated magnetic circuit to generate a magnetic field, said magnet having a substantially flat surface;

positioning an electrical coil on said base for reciprocal linear motion relative to said magnet, said electrical coil having a substantially flat surface, and said coil being mounted on said base to establish a gap between said surface of said magnet and said surface of said coil with a distance of approximately 0.75 mm across said gap when no current is running through said coil; and connecting a voltage means to said coil for selectively driving a current of less than approximately two amperes through said coil to interact with said magnetic field of said magnet to generate as much as a 100 kg force on said coil.

2. A method as recited in claim 1 wherein said unsaturated magnet is a first magnet and said flat surface of said electrical coil is a first surface, and wherein said method further comprises the steps of:

mounting a second unsaturated magnet on said base to cooperate with said first magnet in generating said magnetic field, said second magnet having a substantially flat surface and said coil having a second substantially flat surface, said second magnet being mounted on said base to establish a gap between said flat surface of said second magnet and said second flat surface of said coil with a distance of approximately 0.75 across said gap when no current is running through said coil; and providing a return path between said first magnet and said second magnet.

3. A method as recited in claim 2 wherein said return path is made of steel.

4. A method as recited in claim 1 further comprising the step of positioning said coil on a bobbin.

5. A method as recited in claim 4 wherein said bobbin is made of plastic.

6. A method as recited in claim 1 wherein said coil is made of 20–40 gauge copper wire.

7. A method as recited in claim 1 further comprising the step of fixedly mounting said magnet on said base.

8. A method as recited in claim 1 wherein said magnet is a permanent magnet.

9. A method for generating a one hundred kilogram force using a linear voice coil actuator with an electrical current through an electrical coil, the coil being positioned in an unsaturated magnet circuit generating a magnetic field, the method comprising the steps of:

positioning a substantially flat surface of the electrical coil in a substantially parallel relationship with a substantially flat surface of the magnet, the coil being positioned at a distance from the magnet to establish a gap therebetween, the distance across the gap being approximately 0.75 mm when no current is running through the coil; and activating a voltage means to selectively drive a current of less than approximately two amperes through the coil, the electrical current of the coil interacting with the magnetic field of the magnet to generate approximately as much as a 100 kg force on the coil.

10. A method as recited in claim 9 wherein the magnet is mounted on a base and the coil is positioned on the base for relative reciprocal linear motion therebetween while maintaining the distance across the gap.

11. A method as recited in claim 10 wherein the unsaturated magnet is a first magnet and the flat surface of the electrical coil is a first surface, and wherein the method further comprises the steps of:

mounting a second unsaturated magnet on said base to cooperate with the first magnet in generating the magnetic field, the second magnet having a substantially flat surface and the coil having a second substantially flat surface, the second magnet being mounted on the base to establish a gap between the flat surface of the second magnet and the second flat surface of the coil with a distance of approximately 0.75 across the gap when no current is running through the coil; and providing a return path between the first magnet and the second magnet.

12. A method as recited in claim 11 wherein the return path is made of steel.

13. A method as recited in claim 11 further comprising the step of positioning said coil on a plastic bobbin with the bobbin slidingly positioned in the base.

14. A method as recited in claim 11 wherein the coil is made of 20–40 gauge copper wire.

15. A method as recited in claim 11 wherein the magnet is a permanent magnet.

16. A linear voice coil actuator having a burn-out-proof coil, wherein the actuator is capable of continuously generating approximately as much as a one hundred kilogram force while running less than two amperes of current through the coil, the actuator comprising:

a base;

a magnet mounted on said base in an unsaturated magnetic circuit to generate a magnetic field, said magnet having a substantially flat surface;

an electrical coil positioned on said base for reciprocal linear motion relative to said magnet, said electrical coil having a substantially flat surface, and said coil being mounted on said base to establish a gap between said surface of said magnet and said surface of said coil with a distance of approximately 0.75 mm across said gap when no current is running through said coil; and a voltage means connected to said coil for selectively driving a current of less than approximately two amperes through said coil to generate an electrical current, said electrical current in said coil interacting with said magnetic field of said magnet to generate as much as 100 kg force on said coil.

17. An actuator as recited in claim 16 wherein said magnet is a first magnet and said flat surface of said electrical coil is a first surface, said actuator further comprising:

a second magnet mounted in an unsaturated magnetic circuit on said base to cooperate with said first magnet in generating said magnetic field, said second magnet having a substantially flat surface and said coil having a second substantially flat surface, said second magnet being mounted on said base to establish a gap between said flat surface of said second magnet and said second flat surface of said coil with a distance of approximately 0.75 across said gap when no current is running through said coil; and a return path interconnecting said first magnet and said second magnet.

18. An actuator as recited in claim 17 wherein said return path is made of steel.

19. An actuator as recited in claim 16 further comprising a plastic bobbin with said coil positioned on said bobbin and wherein said coil is made of 20–40 gauge copper wire.

20. An actuator as recited in claim 16 further comprising an aluminum bobbin with said coil positioned on said bobbin and wherein said coil is made of 20–40 gauge copper wire.

21. An actuator as recited in claim 16 wherein said magnet is a permanent magnet.

* * * * *